US008249770B2

(12) United States Patent
Bennewitz

(10) Patent No.: US 8,249,770 B2
(45) Date of Patent: Aug. 21, 2012

(54) HYBRID CONTROLLER EMPLOYING SYSTEM REMEDIAL ACTION FUNCTION

(75) Inventor: Michael Bennewitz, Bloomfield Township, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1241 days.

(21) Appl. No.: 12/021,354

(22) Filed: Jan. 29, 2008

(65) Prior Publication Data

US 2009/0192663 A1 Jul. 30, 2009

(51) Int. Cl.
*G01M 17/00* (2006.01)
*B60R 25/10* (2006.01)
*B60Q 1/00* (2006.01)
*G08B 5/24* (2006.01)

(52) U.S. Cl. ...... 701/29.2; 701/29.1; 903/904; 903/905; 903/906; 340/426.24; 340/438; 340/488

(58) Field of Classification Search ............ 701/29, 701/29.1, 29.2; 703/8; 903/904–906; 340/426.24, 340/438, 488
See application file for complete search history.

(56) References Cited

U.S. PATENT DOCUMENTS

| 6,242,873 B1 * | 6/2001 | Drozdz et al. ............ 318/139 |
| 6,962,224 B2 * | 11/2005 | Nakanowatari ......... 180/65.225 |
| 2003/0158635 A1 * | 8/2003 | Pillar et al. ............ 701/1 |
| 2003/0158638 A1 * | 8/2003 | Yakes et al. ............ 701/22 |
| 2003/0158640 A1 * | 8/2003 | Pillar et al. ............ 701/33 |
| 2004/0024502 A1 * | 2/2004 | Squires et al. ............ 701/33 |
| 2004/0245947 A1 * | 12/2004 | Wilton et al. ............ 318/139 |
| 2005/0113988 A1 * | 5/2005 | Nasr et al. ............ 701/22 |
| 2005/0167172 A1 * | 8/2005 | Fernandez ............ 180/65.8 |
| 2008/0021628 A1 * | 1/2008 | Tryon ............ 701/99 |
| 2008/0051977 A1 * | 2/2008 | Tryon ............ 701/103 |
| 2008/0071438 A1 * | 3/2008 | Nasr et al. ............ 701/22 |
| 2009/0145674 A1 * | 6/2009 | Lee et al. ............ 180/65.1 |

OTHER PUBLICATIONS

Katsis, Dimosthenis C., Development of a Testbed for Evaluation of Electric Vehicle Drive Performance, Aug. 27, 1997, http://scholar.lib.vt.edu/theses/available/etd-102497-12366/, pp. 1-92.*

* cited by examiner

*Primary Examiner* — James P Trammell
*Assistant Examiner* — Majdi Alsomiri
(74) *Attorney, Agent, or Firm* — Ralph E. Smith

(57) ABSTRACT

A hybrid electric vehicle (HEV) employing a hybrid system using both an internal combustion engine and a second motor/generator as a propelling power source for vehicle propulsion, and also employing a first generator driven by the engine for power generation, an integrated HEV control system is provided to control the engine, and the first and second motor/generators. The integrated HEV control system is also operable for detecting the presence of system failures and thereafter selecting at least one remedial action responsive to the system failures such that the system failures are corrected or minimized. The selected remedial action is also verified as being appropriate, monitored and thereafter executed.

16 Claims, 5 Drawing Sheets

| 110 \ 112 | Non recoverable Shutdown Sys | Recoverable Shutdown Sys | Shutdown Engine | Inhibit engine stop while running | Creep torque | Speed control module | Use remaining gears (safe haven) | Limited to mode 1/2 | Limit Axle Torque Request | Inhibit Regen Braking |
|---|---|---|---|---|---|---|---|---|---|---|
| Non recoverable Shutdown Sys | ■ | | | | | | | | | |
| Recoverable Shutdown Sys | | ■ | | | | | | | | |
| Shutdown Engine | | | ■ | | ▨ | | ▨ | ▨ | ▨ | ▨ |
| Inhibit engine stop while running | | | | ■ | ▨ | ▨ | ▨ | ▨ | ▨ | ▨ |
| Creep torque | | | | | ■ | ▨ | | | | |
| Speed control module | | | ▨ | ▨ | | ■ | | | | |
| Use remaining gears (safe haven) | | | ▨ | ▨ | | | ■ | ▨ | | |
| Limited to mode 1/2 | | | ▨ | ▨ | | | ▨ | ■ | | |
| Limit Axle Torque Request | | | ▨ | ▨ | | | | | ■ | |
| Inhibit Regen Braking | | | ▨ | ▨ | | | | | | ■ |

HYBRID CONTROLLER EMPLOYING SYSTEM REMEDIAL ACTION FUNCTION

FIELD OF THE INVENTION

The present disclosure relates generally to system management functions such as, for example, those that are used in hybrid electric vehicles (HEV), and more specifically, to a system management function contained within a hybrid controller (HC) of an HEV that is operable for coordinating system remedial actions of a multi-mode hybrid system architecture.

BACKGROUND OF THE INVENTION

In recent years there have been proposed and developed various types of hybrid system equipped automotive vehicles using both an engine and an electric motor as a driving power source. These vehicles are commonly known as hybrid electric vehicles (HEV). New developments in hybrid technology have allowed manufacturers to provide customers with multi-mode hybrid system vehicles, as opposed to single mode hybrid system vehicles. In order to ensure that the HEV can operate effectively and safely without the full availability of controllers and signals, manufacturers have found it desirable to have a system which precisely monitors, detects, and determines system failures. Further, manufacturers have found it desirable to have a system which selects and calibrates system remedial actions responsive to such system failures. Upon execution of the selected and calibrated remedial actions, manufacturers have also found it desirable to monitor the relevant remedial actions to ensure that they have executed properly, otherwise alternative system remedial actions must be executed. Therefore, a need exists in the art for such a system as the one described herein.

BRIEF SUMMARY OF THE INVENTION

In various exemplary embodiments, the present invention described herein provides a multi-mode hybrid control system operable for use with a hybrid electric vehicle (HEV). In exemplary embodiments, a hybrid controller (HC) is incorporated in the multi-mode hybrid control system of the HEV and employs a system remedial action ring (SRAR) routine for coordinating a plurality of remedial actions responsive to detected system failures of the control system. Additionally, in various exemplary embodiments, the present invention provides a SRAR routine incorporated within a HC for selecting and monitoring remedial actions and generating output and service messages. In various other exemplary embodiments, a SRAR routine is provided for collecting all demanded remedial actions, prioritizing the execution of the demanded remedial actions and monitoring the same to determine if other actions need to be executed. Advantageously, the provided SRAR routine enables the HEV to be driven in "limp home modes." To manage the limp home modes and to ensure safe system behavior at all times, all system remedial actions are coordinated by the SRAR routine. Other comparable uses are also contemplated herein, as will be obvious to those of ordinary skill in the art.

In exemplary embodiments, the present invention provides a system remedial action ring (SRAR) routine operable for use with a HC of a multi-mode hybrid control system. In all exemplary embodiments, the SRAR routine generally includes a plurality of operating functions or bubbles. The operating functions generally include: a selection and calibration function, a logic function, a monitoring function and an output function for generating output and service messages.

In exemplary embodiments, the selection and calibration function is operable for detecting and determining the presence of system failures or flags in the hybrid control system and thereafter selecting at least one remedial action responsive to the detected system failure or flag. The selection of the remedial action may be done by use of a selection array or matrix. By use of the selection array, the function is provided with the ability to assign remedial actions to specific failures. In exemplary embodiments, the remedial actions are calibratable. However, to save memory in the HC or avoid calibration failures the detected system failure may be determined on a more specific nature, thereby allowing a more specific remedial action to be selected without calibration.

In exemplary embodiments, the logic function serves to collect all selected and demanded remedial actions of the selection arrays and the monitoring function. Once all the remedial actions are collected, the logic function verifies that they are required to be executed. If the selected actions are not required, the logic function adds and/or replaces remedial actions. Further, if two or more remedial actions are required at the same time, the logic function prioritizes the remedial actions to be executed. In exemplary embodiments, the monitoring function serves to monitor all triggered remedial actions to ensure that they have been executed. Further, the monitoring function serves to demand additional remedial actions, if necessary. This function is employed such that safety and efficiency of the system is ensured. More specifically, the monitoring function monitors that the relevant remedial actions have been properly executed and thereafter signals the logic function of any additional remedial actions being demanded.

In exemplary embodiments, the output function triggers flags to execute the remedial actions and execute any other necessary functions. This function may also overwrite the outputs of the logic function. In addition, this function provides for the possibility of triggering additional information for the customer and service like cluster messages and service messages.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present disclosure is illustrated and described herein with reference to the various drawings, in which like reference numbers denote like system components and/or method steps, respectively, and in which:

FIG. 4 is a diagram of a matrix array of a logic function of the SRAR routine illustrated in accordance with an exemplary embodiment of the present invention.

DETAILED DESCRIPTION OF THE INVENTION

Figure 1:
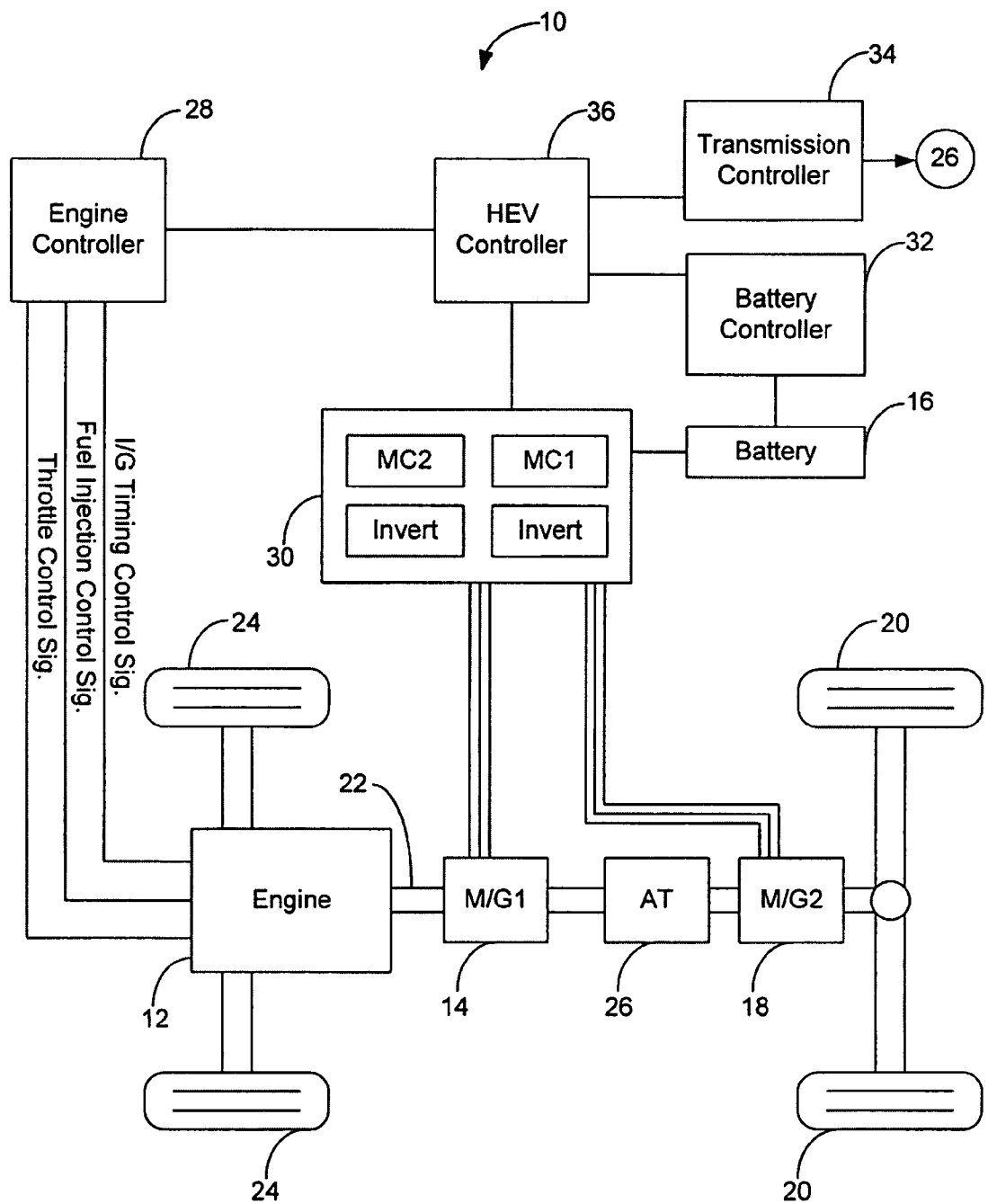
FIG. 1 is a system block diagram illustrating a control system of a hybrid electric vehicle (HEV) constructed in accordance with an exemplary embodiment of the present invention.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In various exemplary embodiments, the present invention described herein provides a "multi-mode hybrid system" (MMHS) operable for use with a hybrid electric vehicle (HEV). It will be understood by those skilled in the art that the disclosed MMHS may be used and incorporated into any suitable automotive vehicle and/or drive train. In all exemplary embodiments, a hybrid controller (HC) is incorporated in the MMHS of the HEV and employs a system remedial action ring (SRAR) routine for coordinating a plurality of remedial actions responsive to detected system failures of the control system. It will be understood by those skilled in the art that the term "multi-mode hybrid system", or advanced hybrid system 2 (AHS2) is a HEV technology. The MMHS typically uses two sets of gears in an automatic transmission: one for an internal combustion engine and another to multiply the power of a pair of electric motors. The two modes of operation are: input-split mode and compound-split mode. In operation at low speeds, the HEV can move with either the electric motor/generators, the internal combustion engine, or both, making it a "full" hybrid. All accessories of the HEV remain functioning on electric power, and the engine can restart instantly, if needed. In this mode, one of the motor/generators (M/G 1) acts as a generator, while the other operates as a motor (M/G 2). This mode is operational using the first and second gear ratios of the transmission.

At higher speeds or heavier loads, the internal combustion engine always runs, and the system uses advanced technologies like Active Fuel Management (AFM) and late intake valve closing to optimize fuel efficiency. This mode begins at the point where one of the motor/generators reaches zero speed; at this point some clutches within the system engage while others disengage to alter the physical configuration of the transmission, and the velocity is Vshift. Immediately after the shift, both electric machines operate as motors and the first gear ratio is employed. At a given velocity above Vshift, the second gear ratio is employed, and M/G 2 begins to operate as a generator, while also slowing down its angular speed. When the angular speed of M/G 2 is zero, the third gear ratio is employed, and M/G 1 begins to operate again as a generator. As the vehicle velocity increases, the fourth gear ratio is employed, and M/G 1 begins to operate as a generator and M/G 2 as a motor again.

Although the transmission mechanically has only four conventional gear ratios, the electric motors allow it to function as a continuously variable transmission (CVT). This variable ratio functions in addition to the torque multiplication of the planetary gears.

A special automatic transmission incorporates two 60 kW (80 hp) DC electric motors, two planetary gearsets, and two selectively-engaging friction clutches. This system amplifies the output of the electric motors similarly to the way in which a conventional transmission amplifies the torque of an internal combustion engine. It also transfers more of the engine's torque to the wheels, making the transmission more efficient even without the electric motors in use. Finally, the whole system fits into the space of, and indeed appears as, a conventional 4L60-E automatic transmission.

A 300 volt battery pack is housed elsewhere in the vehicle to store energy. Most applications will also include 120 volt AC power outlets.

As mentioned above, in various exemplary embodiments, the present invention provides a SRAR routine incorporated within a HC for selecting and monitoring remedial actions and generating output and service messages to a customer. In various other exemplary embodiments, a SRAR routine is provided for collecting all demanded remedial actions, prioritizing the execution of the demanded remedial actions and monitoring the same to determine if other actions need to be executed. Advantageously, the provided SRAR routine enables the HEV to be driven in "limp home modes." It will be understood by those skilled in the art that the term "limp home modes" refers to the vehicles being driven without full availability of all controllers and signals. To manage the limp home modes and to ensure safe system behavior at all times, all system remedial actions are coordinated by the SRAR routine. Other comparable uses are also contemplated herein, as will be obvious to those of ordinary skill in the art.

Referring now to the Figures and particularly FIG. 1, a hybrid-electric-vehicle (HEV) control system 10 which employs the SRAR routine of the exemplary embodiments is exemplified in a parallel type hybrid electric vehicle using both an internal combustion engine and an electric motor (or an electric motor/generator) for propulsion. It will be understood by those skilled in the art that the following description of a parallel type hybrid vehicle is for exemplary purposes only and is, in no way, limited to the present invention. In fact, the present invention may be readily applied to any type of hybrid electric vehicle including series and combined types. As seen from the system block diagram shown in FIG. 1, the exemplary hybrid vehicle is comprised of an internal combustion engine 12 that produces power by combusting fuel such as gasoline, diesel fuel oil, liquefied petroleum gas, or the like, a first motor/generator (M/G 1) 14 electrically connected to a car battery 16 and enables both a power running mode and a regenerative running mode, and a second motor/generator (M/G 2) 18 electrically connected to battery 16 and enables both a power running mode and a regenerative running mode. It will be understood that the battery 16 may be any conventional battery suitable for use with hybrid electric vehicles. In particular, the battery 16 may be a conventional electrochemical device that stores electric energy in chemical form. The engine 12 is connected or linked to a pair of rear road wheels 20, both serving as main drive wheels, to drive them.

The M/G 1 14 is substantially driven by means of engine 12 and serves as a generator (during the regenerative running mode) that generates electricity and recharges the battery 16. During the power running mode, M/G 1 14 also serves as an engine start-up motor (or an engine starter) that starts up the engine 12. M/G 1 14 is connected directly to an output shaft (an engine crankshaft) 22 of engine 12. Therefore, the rotational speed of M/G 1 14 is always equal to an engine speed of engine 12.

The M/G 2 18 is connected or linked to a pair of front road wheels 24, both serving as auxiliary drive wheels. During the power running mode, M/G 2 18 mainly serves as a drive motor, which drives front road wheels 24. Conversely, when a required driving torque is a negative value, M/G 2 18 can be operated in the regenerative running mode for energy regeneration. It will be understood by those skilled in the art that the rear road wheels 20 can be mainly driven by means of engine 12, whereas front road wheels 24 can be subsidiary driven by means of M/G 2 18 in case of necessity. In exemplary embodiments, the HEV can use both the engine 12 and the M/G 2 18 for vehicle propulsion functions as a hybrid electric four-wheel-drive vehicle without using a transfer device.

An automatic transmission (AT) 26 is provided in a power-transmission path from engine 12 to rear road wheels 20, so as to automatically change a reduction ratio or a transmission gear ratio, that is, a ratio of output speed to input speed and a ratio of output torque to input torque. The AT 26 may include a clutch element or a clutch device (not shown) that connects and disconnects the rear wheel side to and from each of engine crankshaft 22 and M/G 1 14. In exemplary embodiments, the AT 26 may be comprised of a planetary-gear systems equipped automatic transmission whose number of speeds is limited or finite. In other exemplary embodiments, the AT 26 may be comprised of a continuously variable transmission (CVT).

The HEV control system 10 also includes an engine controller 28, a motor/generator controller 30, a battery controller 32, a transmission controller 34, and an integrated electronic hybrid electric vehicle (HEV) control unit or an electronic hybrid electric vehicle controller (HC) 36. Each of controllers 28-34 is electrically and communicably connected to integrated HC 36 through a plurality of signal lines or communication buses. In exemplary embodiments, each controller 28-36 generally comprises a microcomputer that includes a microprocessor, having input/output (I/O), non-volatile memory (NVM) such as read only memory (ROM), electrically erasable ROM (EEPROM), or flash memory, random access memory (RAM), and a central processing unit (CPU). The controllers 28-36 may also include calibration constants stored in NVM that may be applied to control numerous powertrain types. The controllers 28-36 may communicate with vehicle systems using discrete I/O, analog I/O, and/or an automotive communications network including, but not limited to, the following commonly used vehicle communications network standards: CAN, SAE J1850, and GMLAN. In other exemplary embodiments, the HC 36 may be configured by a plurality of microcomputers. In still other exemplary embodiments, the controllers 28-36 may be integrated into a single control unit.

As is known in the art, the input/output interface (I/O) is operable for receiving input information from various engine/vehicle switches and sensors, such as, for example, a throttle opening sensor, an airflow sensor, an engine temperature sensor, an accelerator opening sensor, a vehicle speed sensor, a SOC (state of charge) sensor, an ignition switch and the like. Within the controllers 28-36, the central processing units (CPUs) allow access by the I/O interface of input informational data signals from the engine/vehicle switches and sensors, and are responsible for carrying various control programs stored in the memories and capable of performing necessary arithmetic and logic operations. The engine/vehicle switches and sensors are provided to detect or monitor specific operating conditions on the engine or vehicle. Computational results or arithmetic calculation results, in other words, calculated output signals or control signals are relayed via the output interface circuitries of the controllers 28-36 to output stages, for example, the shift valves of the automatic transmission, fuel injectors, spark plugs, an electronically-controlled throttle valve actuator, M/G 1 14, M/G 2 18, and a clutch element installed in the AT 26.

More specifically, various engine controls for engine 12, such as ignition timing control, fuel injection control and throttle opening control, are executed in response to respective control signals from engine controller 28. Various motor/generator controls, such as torque control and speed control for each of M/G 1 14 and M/G 2 18, are executed in response to respective control signals from motor/generator controller 30. Battery controller 32 is provided to properly control a state of charge (SOC) of battery 16. The speed-change control for AT 26 is executed in response to a control signal from transmission control unit 34. Motor/generator controller 30 may also control switching between the power running mode and the regenerative running mode of each of motor/generators 14 and 18.

Figure 2:
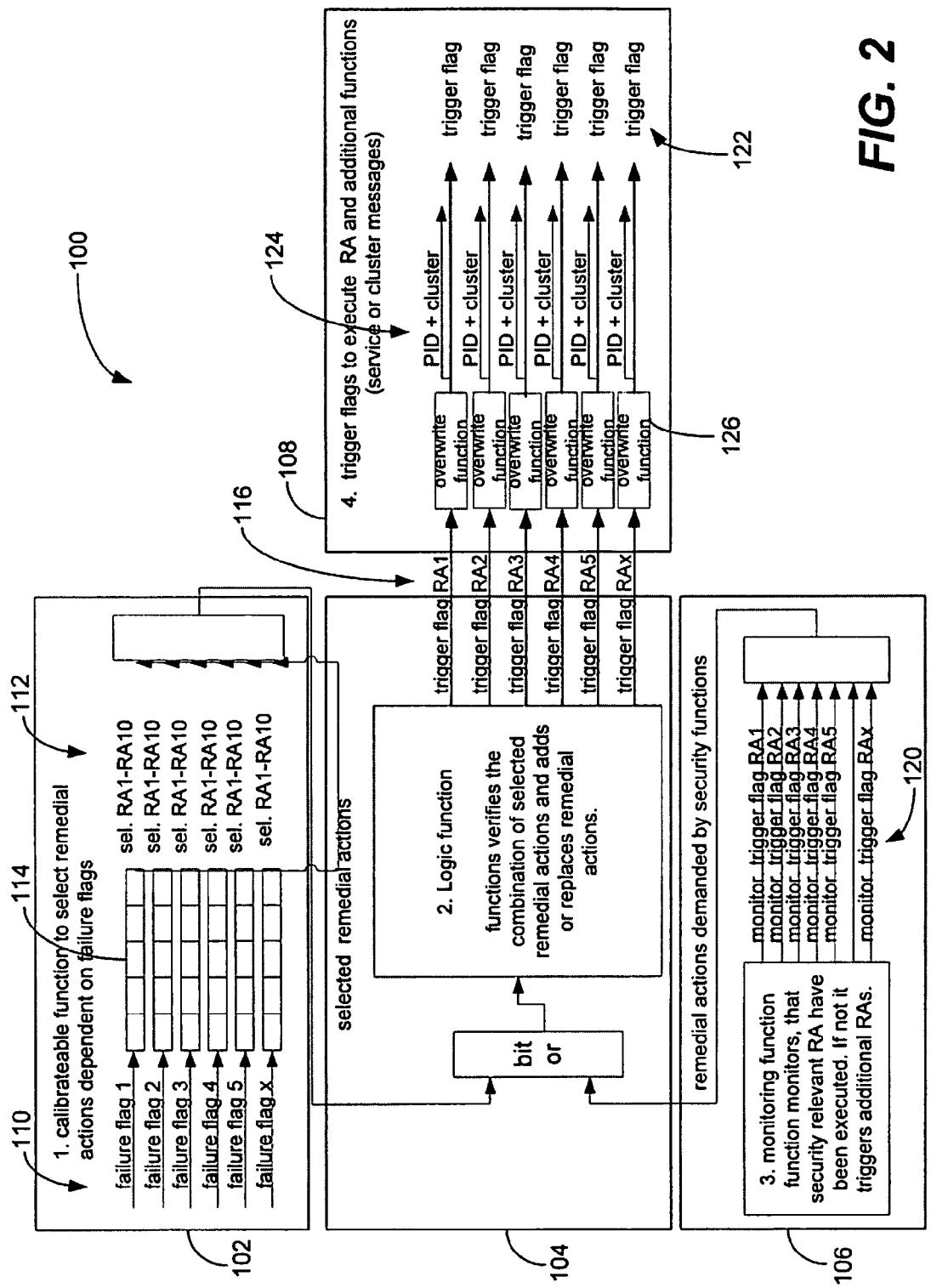
FIG. 2 is a control map diagram illustrating a main system remedial action ring (SRAR) routine executed within a HEV controller incorporated in the control system of the hybrid vehicle an exemplary embodiment of the present invention.

Referring now to FIG. 2, a high level modular software architecture or structure of the control system 10 for a HC is illustrated in accordance with an exemplary embodiment of the present invention. As shown, the present invention provides a system remedial action ring (SRAR) routine 100 operable for use with a MMHS, or an advanced hybrid system 2 (AHS2), of the HC 36. The SRAR routine 100 software of the present invention is executed and stored in the HC 36. The software architecture is independent of the physical implementation of the controller hardware. Execution of the software may be implemented in a distributed computing environment with all or different portions of software being executed in the HC 36. The following description assumes that all of the software is executed in a HC 36. In all exemplary embodiments, the SRAR routine 100 generally includes a plurality of operating functions or bubbles. The operating functions include a selection or calibration function 102, a logic function 104, a monitoring function 106 and an output function 108 for generating output and service messages.

In exemplary embodiments, the selection or calibration function 102 is operable for detecting systems failures or flags 110 and thereafter selecting at least one remedial action 112 responsive to the detected system failure or flag (e.g., missing CAN messages, P-codes). In exemplary embodiments, the selection and calibration function 102 may include a diagnostic subroutine operable for determining if the HEV is performing to desired specifications or whether the HEV needs servicing. The diagnostic subroutine may use diagnostic feedback information to isolate the sources of problems or component failures. Accordingly, the diagnostic subroutine: may determine if a change in performance is due to changes in the HEV system (such as tire pressure, tire tread condition, drive-line losses, lubrication, and/or other similar measurements) as opposed to the engine, transmission, or other power generation hardware (such as accessories, electric motor, flywheel, or other sources or sinks of torque). Once a problem or failure 110 is diagnosed, the selection and calibration function 102 begins to take corrective or remedial action to eliminate or minimize the problem by selecting a remedial action 112 (discussed below). In addition, in exemplary embodiments, the driver may be informed that the HEV needs servicing through visual or audible feedback, and/or the telematics system is enabled to provide further assistance as needed.

Figure 3:
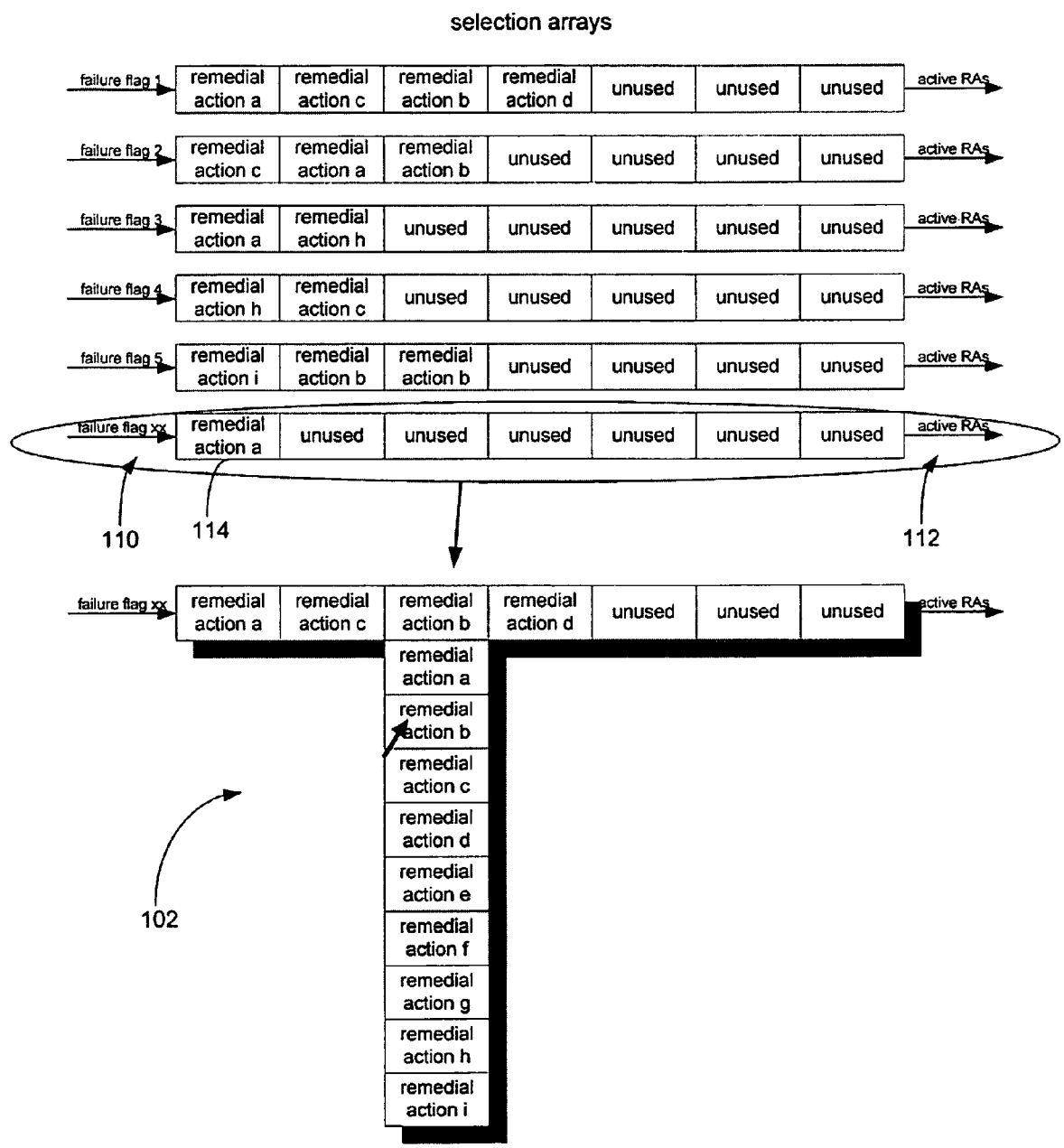
FIG. 3 is a diagram of a selection array of a selection and calibration function of the SRAR routine illustrated in accordance with an exemplary embodiment of the present invention.

As best shown in FIG. 3, the selection of the remedial action 112 may be done by use of a selection array or matrix 114. By use of the selection array 114, the calibration function is provided with the ability to assign remedial actions 112 to specific failures. More specifically, for each failure 110 detected, a finite number or combination of remedial actions 112 are available. The calibration function 102 selects the appropriate remedial action 112 which is most responsive to correcting or minimizing the system failure 110 detected. In the example illustrated in FIG. 3, for "failure flag xx" the selection array 114 provides numerous remedial actions. For instance, under "remedial action b", actions available are "remedial actions a-i." In exemplary embodiments, the remedial actions 112 are calibratable. However, to save memory in the HC 36 or to avoid calibration failures, the detected system failures may be determined on a more specific nature, thereby allowing a more specific remedial action to be selected without calibration.

Referring back to FIG. 2, once the remedial actions 112 are selected from the selection array 114, the logic function 104 collects all demanded remedial actions 112 of the selection arrays 114 and verifies that the selected remedial actions are required to be executed. If the selected actions are not required, the logic function 104 adds and/or replaces remedial actions 112. Further, in exemplary embodiments, it is possible that one or more remedial actions 112 are demanded at the same time. In some instances, these remedial actions 112 are mutually exclusive (e.g., shut down of combustion engine/inhibit engine stop). If such an instance occurs, the logic function 104 prioritizes the remedial actions 112 to be executed and determines if additional or other remedial actions have to be executed as well. Once the selected remedial actions are verified, and all addition or other remedial actions are determined, the logic function 104 generates a trigger flag signal 116 which is forwarded to and received by the output function 108.

Figure 5:
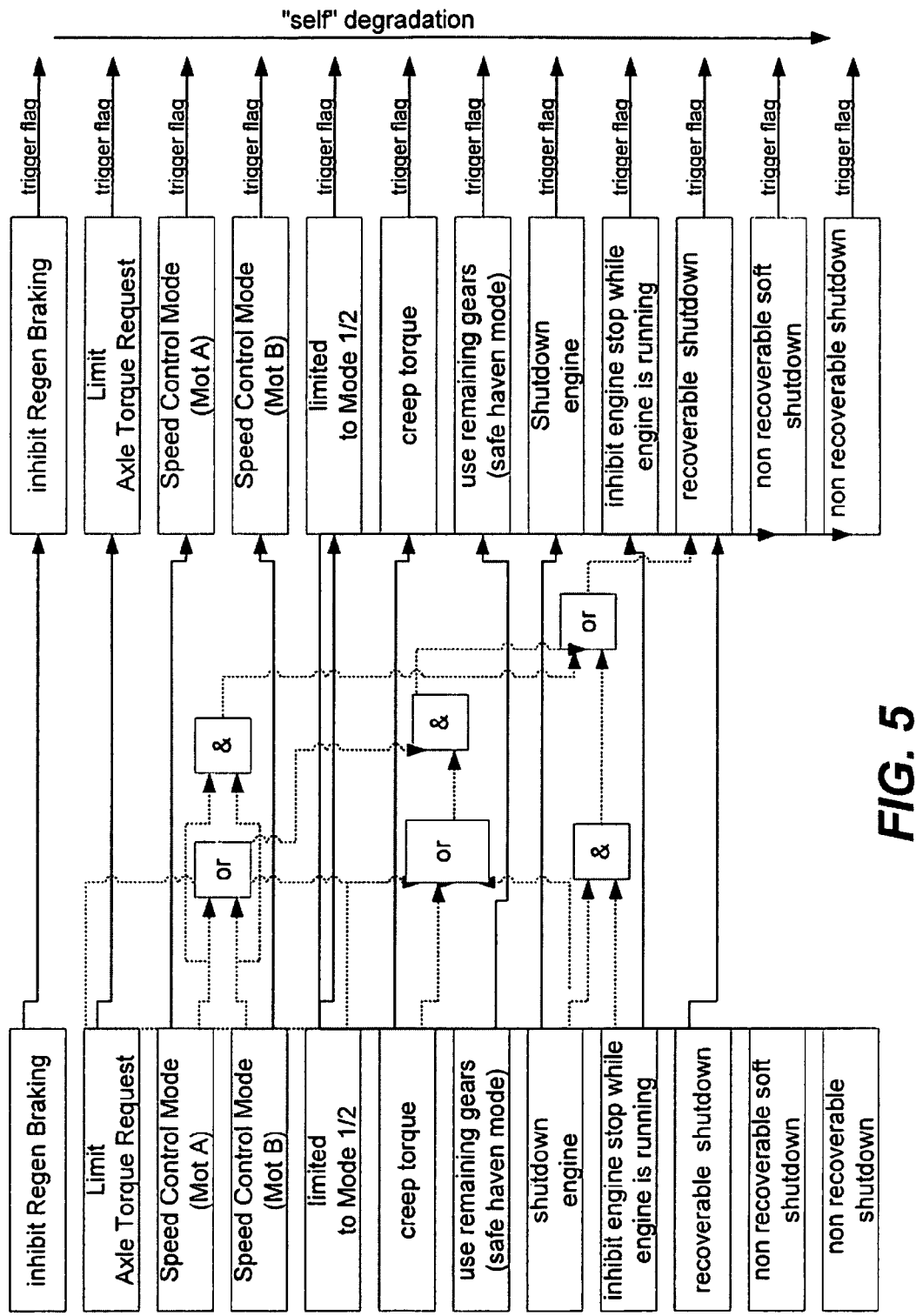
FIG. 5 is a diagram of the matrix array of FIG. 4, wherein a hierarchical order of the possible combinations of the remedial actions is detailed in a reduced logic form.

Referring now to FIG. 4, a matrix array 118 for the logic function 104 is illustrated in accordance with an exemplary embodiment of the present invention. As illustrated by the example, the matrix array 118 sets forth combinations of remedial actions 112 which are possible under the MMHS system and responsive to specific system failures 110. Referring to FIG. 5, the matrix array 118 of FIG. 4 is further explained. As shown, the matrix array 118 is reduced in logic such that the remedial actions 112 are in a hierarchic order. As shown, some of the remedial actions 112 have a higher order or a more limiting effect on the operation of the system. For example, "creep torque" limits the operation of the system more than "reduced output torque." Accordingly, a trigger flag signal for "creep torque" is generated. For this reason, a logic function is not necessary for all possible combinations of remedial actions.

Referring back to FIG. 2, the monitoring function 106 monitors that security relevant remedial actions have been executed. If such remedial actions have not been executed, then the monitoring function 106 generates and signals the logic function 104 that additional remedial actions 112 are being demanded by system security functions. This function is implemented substantially for safety reasons in case a triggered remedial action has not been executed. An example of when a triggered remedial action has not executed may be when a processor fault exists. The signals demanding additional remedial actions are forwarded to and received by the logic function 104 via a monitor trigger flag 120.

The output function 108 triggers flags 122 to execute the remedial actions 112 and execute any other necessary functions. This function may overwrite the outputs of the logic function 104, for example for test purposes, by use of a overwrite function 126. In addition, this function gives the possibility to trigger additional information for the customer and service like cluster messages and service messages 124 (e.g., PIDs).

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A hybrid electric vehicle comprising:
an internal combustion engine for propelling the vehicle;
an electric motor for propelling the vehicle;
at least one electric generator driven by the engine for power generation;
a battery electrically connected to the motor and the at least one generator;
sensors and switches for detecting operating conditions on the engine and the vehicle;
a control system electrically connected to the engine, the motor, the at least one generator, the battery and the sensors and switches for controlling the engine, the motor, the at least one generator, the battery and the sensors and switches, the system comprising:
a system failure detection function for detecting the presence of a system failure;
a remedial action selection function for selecting at least one remedial action responsive to a detected system failure;
a logic function for collecting all selected remedial actions and prioritizing the execution of the remedial actions; and
an output function for triggering the remedial action to be executed.

2. The hybrid electric vehicle according to claim 1, wherein the logic function is also operable for verifying whether the remedial action is appropriate for the detected system failure.

3. The hybrid electric vehicle according to claim 1, wherein the control system further includes a monitoring function for monitoring the triggered remedial actions to ensure that the remedial action are executed.

4. The hybrid electric vehicle of claim 3, wherein the monitoring function is operable for determining if security relevant remedial actions are required.

5. The hybrid electric vehicle of claim 1, wherein the output function is operable for generating output and service messages to a customer.

6. The hybrid electric vehicle of claim 1, wherein the remedial action selection function employs a selection array for selecting remedial actions, said selection array containing a hierarchic order of remedial actions responsive to corresponding system failures.

7. The hybrid electric vehicle of claim 2, wherein the logic function is operable for adding or replacing remedial actions, if necessary.

8. A hybrid vehicle control system, said control system being electrically connected to an engine, a motor, a generator, a battery and a plurality of sensors and switches of a hybrid electric vehicle and being operable for controlling the engine, the motor, the generator, the battery and the sensors and switches, the control system comprising:
- a detection function for detecting whether a system failure has occurred;
- a selection function for selecting at least one remedial action responsive to a detected system failure;
- a logic function for collecting all selected remedial actions and prioritizing the execution of the remedial actions; and
- a output function for triggering the at least one remedial action,
- wherein the control system allows the hybrid electric vehicle to be driven without the full availability of all controllers and signals.

9. The control system according to claim 8, wherein the logic function is also operable for verifying whether the at least one remedial action is appropriate for the detected system failure.

10. The control system according to claim 8, wherein the selection function is operable for calibrating the at least remedial action.

11. The control system according to claim 8, wherein the control system further includes a monitoring function for monitoring the triggered remedial actions to ensure that the remedial action are executed.

12. The control system of claim 11, wherein the monitoring function is operable for determining if security relevant remedial actions are required.

13. The control system of claim 8, wherein the output function is operable for generating output and service messages to a customer.

14. The control system of claim 8, wherein the selection function employs a selection array for selecting remedial actions, said selection array containing a hierarchic order of remedial actions responsive to corresponding system failures.

15. The hybrid electric vehicle of claim 9, wherein the logic function is operable for adding or replacing remedial actions, if necessary.

16. A method for automatically selecting and implementing at least one remedial action responsive to a system failure of a hybrid electric vehicle containing a control system configured to execute the method, the method comprising the steps of:
- detecting the presence of a system failure within the hybrid electric vehicle;
- selecting at least one remedial action responsive to the detected system failure;
- calibrating the at least one remedial action, if necessary;
- verifying that the at least one remedial action is appropriate for the detected system failure;
- when more than one remedial action is required and selected, prioritizing the remedial actions to be executed;
- triggering the at least one remedial action to be executed;
- monitoring that the at least one remedial action has been executed; and
- triggering a substitute remedial action if the at least one remedial action is not executed.

* * * * *